US006692422B2

(12) United States Patent
Yamaguchi et al.

(10) Patent No.: US 6,692,422 B2
(45) Date of Patent: Feb. 17, 2004

(54) ROLL

(75) Inventors: Koji Yamaguchi, Gifu (JP); Yukio Ohyama, Aichi (JP); Tsutomu Saito, Aichi (JP); Naoaki Sasakibara, Aichi (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/091,463

(22) Filed: Mar. 7, 2002

(65) Prior Publication Data

US 2002/0160895 A1 Oct. 31, 2002

(30) Foreign Application Priority Data

Mar. 9, 2001 (JP) ....................................... 2001-065971

(51) Int. Cl.[7] ................................................ F16C 13/00
(52) U.S. Cl. ............................................ 492/56; 492/49
(58) Field of Search ............................. 492/56, 49, 53; 29/895.32, 895.3; 399/176

(56) References Cited

U.S. PATENT DOCUMENTS 6,146,320 A * 11/2000 Yoshikawa et al. ........... 492/56
6,190,295 B1 * 2/2001 Kawano et al. ............... 492/56
6,283,903 B1 * 9/2001 Onuki et al. .................. 492/56
6,283,904 B1 * 9/2001 Itoh et al. ...................... 492/56
6,319,181 B1 * 11/2001 Naoi et al. ..................... 492/56
6,454,688 B1 * 9/2002 Okuda et al. ................. 492/56
2002/0039955 A1 * 4/2002 Takeda et al. ................ 492/56
2002/0086781 A1 * 7/2002 Okuda et al. ................. 492/56
2002/0119324 A1 * 8/2002 Harashima et al. ........... 492/56

* cited by examiner

*Primary Examiner*—Gregory Vidovich
*Assistant Examiner*—Marc Jimenez
(74) *Attorney, Agent, or Firm*—Armstrong, Kratz, Quintos, Hanson & Brooks, LLP

(57) ABSTRACT

A roll has a base material layer, a front surface layer, and stress relaxation layer. The base material layer is made of low hardness rubber material and provided on an outer circumference of a metal core. The stress relaxation layer is provided on the base material layer and made of material which is at least higher in hardness than the base material layer and larger in stretch than the front surface layer. The front surface layer is made of resin material and provided on the stress relaxation layer. The stress relaxation layer is made of rubber material containing self-crosslinking resin. The stress relaxation layer has a thickness in a range of from 5 to 50 μm, and stress not lower than 5 MPa at 10% stretch.

6 Claims, 1 Drawing Sheet

ROLL

BACKGROUND OF THE INVENTION

1. Field of the Invention

The present invention relates to rolls to be used in copying machines or printers, and particularly to conductive rolls to be provided around a photoconductor drum.

2. Description of the Related Art

In a copying machine or a printer, an electrostatic latent image formed on a photoconductor drum is developed by toner (developer) fed from a developing roll. The toner image on the photoconductor drum is transferred to a transfer roll. The toner image is then transferred to a recording paper. Then, the recording paper is heated and pressed so that a picture image is formed on the recording paper. Such a roll as used in a copying machine or printer is generally has a structure in which an outer circumference of pipe-like core made of metal such as aluminum or iron is coated with rubber or resin material.

With reduction in hardness of such rolls, particularly, such conductive rolls including a charge roll, a developing roll, and a transfer roll which are used around a photoconductor drum, the roll is required to have high releasability to prevent the toner (developer) from adhering, for the purpose of ensuring nipping property between the roll and the photoconductor drum. Generally, each of the rolls such as conductive rolls adopts a structure to have a base material layer made of low hardness rubber material and provided on an outer circumference of a metal core, and a front surface layer made of resin material and provided on the base material layer.

As the rubber material constituting the base material layer of such a roll, low hardness rubber in which a softening agent such as oil is added to general-purpose rubber such as NBR or silicon rubber, or foamed rubber of polyurethane has been used. Especially silicon rubber has been used in view of stability in resistance value. As the resin material constituting the front surface layer, resin material have been used which is high in releasability, such as fluororesin, acrylate resin, urethane resin, or silicon resin.

The conductive rolls to be provided around a photoconductor drum are generally used with a difference in peripheral velocity between each conductive roller and the photoconductor drum due to the function of the conductive rollers. Especially, in the developing roller, taking the carrying quantity and developing property of toner into consideration, it is general to provide a peripheral velocity difference so that the peripheral velocity of the developing roll is about 1.1 times–1.5 times as large as the peripheral velocity of the photoconductor drum. Further, although it is general to particularly provide no peripheral velocity difference between the charge roll or the transfer roll and the photoconductor drum, there occurs actually a peripheral velocity difference in some degree due to variations in outer diameter of each roll per se.

Further, in the rolls other than the conductive rolls used around the photoconductor drum, for example, in the carrying rolls for carrying recording paper or in the fixing rolls, each roll is rotating in such a condition that a pair of rolls opposed to each other, that is, a roll in question and another roll which is a matter to be opposed to each other, are disposed to be in contact with each other. Accordingly, even if any peripheral velocity difference is not particularly provided between the rolls opposed to each other, it can be said that there exists, in fact, a certain amount of peripheral velocity difference between the thus opposed rolls.

If any peripheral velocity difference exists between a roll and a matter opposed to the roll, for example, in a case where a photoconductor drum is disposed as the matter opposed to the roll in question, it is apt to generate ripple-like deformation called wrinkles in the surface of the roll in question in the rotation driving. It is considered that such wrinkles are generated as follows. That is, as stated above, the roll is constituted by a base material layer of low hardness rubber material provided on the outer circumference of a metal core and a front surface layer of resin material provided on the base material layer. Accordingly, the soft base material layer is deformed by a peripheral velocity difference between the roll and a matter opposed to the roll in question, so that the deformation causes plastic deformation on the upper front surface layer.

As a method of preventing such ripple-like wrinkles from generating, it is considered that the front surface layer is made of a soft material, or the base material layer is made hard. However, when the front surface layer is made of a soft material, the lowering of the releasability is caused so that the function to be required originally cannot be satisfied. Further, the lowering of the releasability causes a disadvantage called filming due to adhesion of toner in the case where the roll in question is a developing roll. If the base material layer is made hard, on the contrary, it becomes difficult to ensure a sufficient nip width between the roll and an opposed matter such as a photoconductor drum. Accordingly, it is necessary to provide a countermeasure to heighten the accuracy of size of the roll in question per se so that a predetermined nip width can be obtained stably.

Further, in a case of a transfer roll which requires a certain nip width, generally, the roll in question could not help taking a soft roll structure at the sacrifice of the releasability. In addition to the problem of generation of ripple-like wrinkles, it is the existing condition that the mechanism has to be complex because a cleaning member is required to be provided to remove surplus toner adhering onto the roll surface.

SUMMARY OF THE INVENTION

An object of the present invention is to provide a roll which can secure necessary nip properties and releasability, and at the same time, the roll in question does not generate ripple-like wrinkles in the front surface layer even if there exists a peripheral velocity difference between the roll in question and any other opposed matter such as a photoconductor drum.

In order to achieve the object, according to the invention, there is provided a roll including: a base material layer made of low hardness rubber material and provided on an outer circumference of a metal core; and a front surface layer made of resin material and provided on the base material layer; wherein a stress relaxation layer is provided between the base material layer and the front surface layer, the stress relaxation layer being made of material which is at least higher in hardness than the base material layer and larger in stretch than the front surface layer.

In the roll of the invention, specifically, the base material layer is made of rubber material with low hardness not higher than 25 degrees in JIS-A hardness, the front surface layer is made of resin material not larger than 30% in stretch, and the stress relaxation layer is made of material having stress not lower than 5 MPa at 10% stretch.

In the roll of the invention, the stress relaxation layer is made of rubber material added with at least one kind of self-crosslinking resin such as blocked type self-crosslinking isocyanate resin, blocked type self-crosslinking epoxy resin, and blocked type self-crosslinking phenolic resin. The loading of the self-crosslinking resin to the rubber material is 20–150 parts by weight relative to 100 parts by weight of the rubber material.

In the roll according to the invention, the stress relaxation layer has a thickness in a range of from 5 to 50 μm. In the roll according to the invention, preferably, the base material layer has a thickness not smaller than 3 mm, and the roll according to the invention is suitable as a conductive roll having roll hardness not higher than 60 degrees in Asker-C hardness at a load of 1 kg.

DETAILED DESCRIPTION OF THE PRESENT INVENTION

Figure 1:
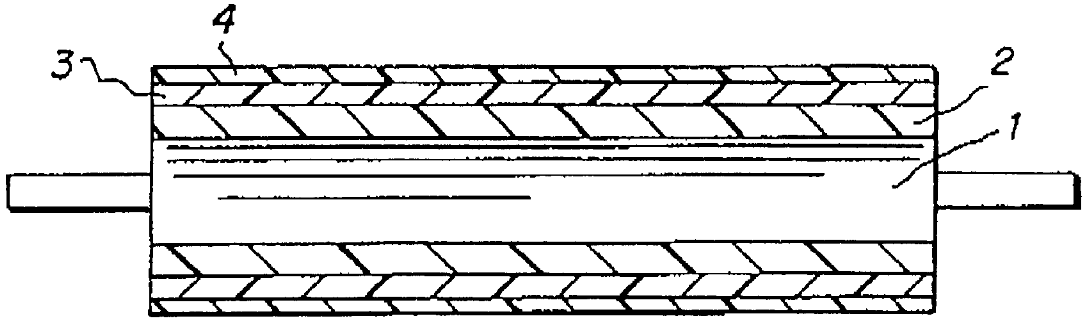
FIG. 1 is a sectional view showing a roll of the present invention.

According to the invention, in a roll having a base material layer made of low hardness rubber material on an outer circumference of a metal core, and a front surface layer relatively hard and made of resin material on the base material layer, there is provided at least a stress relaxation layer between the base material layer and the front surface layer. This stress relaxation layer is made of material which is higher in hardness than the base material layer and larger in stretch than the front surface layer. For example, the stress relaxation layer is made of rubber material added with resin. Incidentally, any layer other than the stress relaxation layer may be provided between the base material layer and the front surface layer for performing any other function, if necessary.

For example, FIG. 1 is a sectional view showing such a roll of the invention. In FIG. 1, a base material layer 2 is disposed on a metal core 1. A stress relaxation layer 3 is disposed on the base material 2. A front surface layer 4 is disposed on a stress relaxation layer.

Particularly, conductive rolls, such as a charge roll, a developing roll, and a transfer roll, are used around a photoconductor drum. Specifically, each roll is configured so as to have a base material layer made of rubber material with low hardness not higher than 25 degrees in JIS-A hardness, and a front surface layer made of resin material not larger than 30% in stretch. In this case, as a stress relaxation layer, it is preferable to use material having stress not lower than 5 MPa at the time of 10% stretch.

Further, the "stretch" of the stress relaxation layer or the front surface layer means "stretch" at the time of cut off as defined in the JIS K6251. Further, the "stress" at the time of 10% stretch of the stress relaxation layer is the "stress" imposed on the material of the layer in question when the material is stretched by 10%, and designates the "stress" at the time of 10% stretch defined in JIS K6251.

When a stress relaxation layer is provided between a base material layer and a front surface layer in a roll in such a manner, ripple-like wrinkles can be prevented from generating in the front surface layer of the roll, even if a peripheral velocity difference exists between the roll in question and an opposed matter such as a photoconductor drum. This is because the stress relaxation layer made of material which is higher in hardness than the base material layer and which is larger in stretch than the front surface layer scatters and relaxes the deformation of the base material layer so that the deformation can be prevented from being transferred to the front surface of the roll. Further, in the roll according to the invention, the stress relaxation layer does not spoil the low hardness of the roll as a whole, so that a necessary nip width can be ensured between the roll in question and another roll such as a photoconductor drum. Further, the roll is provided with the front surface of resin material, so that the roll keeps releasability enough to prevent adhesion of toner.

As the material forming the stress relaxation layer, general-purpose rubber material such as nitrile-butadiene rubber (NBR), hydrogenated nitrile-butadiene rubber (H-NBR), hydrin rubber (CHC), or ethylene-propylene rubber (EPDM), added with resin, can be used. For example, such rubber material added with at least one kind of self-crosslinking resin such as blocked type self-crosslinking isocyanate resin, blocked type self-crosslinking epoxy resin and blocked type self-crosslinking phenolic resin can be used. Incidentally, such self-crosslinking resin is available commercially, for example, in the trade name of DB980K from DAINIPPON INK AND CHEMICALS, INC.

The loading of the self-crosslinking resin to the rubber material is preferably 20–150 parts by weight relative to 100 parts by weight of the rubber material, and more preferably 50–100 parts by weight likewise. If the loading of the self-crosslinking resin is lower than 20 parts by weight relative to 100 parts by weight of the rubber material, it is impossible to obtain the effect that the stretch of the rubber material is suppressed by the addition of the resin, to say it specifically, it is impossible to obtain material that is not lower than 5 MPa in stress at the time of 10% stress. On the contrary, if the loading of the self-crosslinking resin exceeds 100 parts by weight relative to 100 parts by weight of the rubber material, the hardness becomes too high as rubber material. Thus, it becomes difficult to secure a sufficient nip width because the flexibility of the roll is impaired.

The thickness of the stress relaxation layer is preferably in a range of from 5 to 50 μm, more preferably in a range of from 15 to 35 μm. If the stress relaxation layer is thinner than 5 μm, not only is it difficult to make the thickness uniform, but it is also impossible for the stress relaxation layer to play its part to scatter and relax the deformation of the base material layer. On the contrary, if the stress relaxation layer is thicker than 50 μm, it becomes, unfavorably, difficult to secure a sufficient nip width because the flexibility of the roll is impaired.

Ripple-like wrinkles described above will be generated more easily if the base material layer is thicker, specifically when the base material layer is not thinner than 3 mm. In each of rolls according to the invention, however, even if the base material layer is not thinner than 3 mm, it is possible to prevent such ripple-like wrinkles from being generated. In addition, in each of conductive ones of the rolls according to the invention, it is desirable that the roll hardness of the whole roll provided with the stress relaxation layer is kept not higher than 60 degrees in Asker-C hardness (load 1 kg).

EXAMPLE

A pipe of SUM22 measuring 10 mm in diameter by 250 mm in length was subjected to electroless nickel plating so as to form a metal core. A bonding agent was applied to the outer circumferential surface of the metal core. After that, the metal core was disposed in a mold whose inner-diameter shape was cylindrical with a diameter of 20 mm and which was split into two parts, that is, upper and lower parts. Silicon rubber was injected and charged into an air gap between the metal core and the inner-diameter portion of the mold, and then vulcanized and molded at 170° C. for 30 minutes. After that, the metal core was released and extracted from the mold. A rubber layer formed on the outer circumference of the metal core was surface-polished by a cylindrical polishing machine. Thus, a base material layer made of silicon rubber which was 20 mm in diameter (5 mm in thickness) and 10 degrees in JIS-A hardness was obtained.

Next, as shown in the following Table 1, the indicated loadings of parts by weight of self-crosslinking resins were added and mixed to 100 parts by weight of each rubber material. The surface of the base material layer formed on each metal core as described above was coated with the obtained rubber material in a dipping method, and then subjected to vulcanization reaction at 190° C. for 60 minutes, so as to form a stress relaxation layer. Each stress relaxation layer obtained thus was coated with acrylate resin of 14% stretch in a similar dipping method, and hardened at 140° C. so as to form a front surface layer 5 μm thick and made of acrylate resin.

As for each roll obtained thus, roll hardness (Asker-C hardness at a load of 1 kg) was obtained, and generation of wrinkles in the front surface layer was evaluated. That is, each sample of rolls was pressed onto a metal roll having a diameter of 30 mm at a load of 500 gf in one end, and both the rolls were driven to rotate continuously for 24 hours with a peripheral velocity difference of 1.2 times between the metal roll and each sample of rolls. After that, the presence/absence of wrinkles in the front surface layer was checked. These results are shown together in the following Table 1.

| Sample | | 1 | 2 | 3 | 4 | 5 | 6 | 7 | 8 | 9 |
|---|---|---|---|---|---|---|---|---|---|---|
| stress relaxation layer | rubber material | H-NBR | H-NBR | H-NBR | H-NBR | NBR | CHC | none | H-NBR | H-NBR |
| | self-cross-linking resin | isocyanate | isocyanate | epoxy | phenol | isocyanate | isocyanate | none | none | none |
| | parts by weight of added resin | 50 | 100 | 75 | 75 | 75 | 75 | — | — | — |
| | layer thickness (μm) | 30 | 30 | 25 | 33 | 28 | 34 | — | 32 | 27 |
| | at 10% stretch (MPa) | 8 | 12 | 6 | 21 | 7 | 13 | — | 2 | 1.1 |
| | roll hardness (Asker-C) | 48 | 52 | 44 | 53 | 46 | 50 | 31 | 38 | 35 |
| | generation of wrinkles on front surface layer | No | No | No | No | No | No | Yes | Yes | Yes |

As is understood from Table 1, in each of Sample 7 having no stress relaxation layer and Samples 8 and 9 whose stress relaxation layers were made of only general-purpose rubber material, the roll hardness could be kept low, but generation of ripple-like wrinkles was confirmed in the front surface layer after the continuous rotation with a peripheral velocity difference. On the other hand, in each of rolls in Samples 1 to 6 according to the invention, no generation of wrinkles was confirmed, and the roll hardness could be kept within a range required as a conductive roll.

According to the invention, rolls for use in a copying machine or a printer can be provided as follows. That is, in each roll, a stress relaxation layer is provided between its base material layer made of rubber material and its front surface layer made of resin material. Thus, even if there is a difference in peripheral velocity between the roll and an opposed matter such as a photoconductor drum, there is no fear that ripple-like wrinkles are generated in the front surface layer. In addition, the roll according to the invention can keep roll hardness low enough to secure necessary nip properties while keeping releasability high due to the front surface layer. Accordingly, the roll according to the invention is effective particularly as a conductive roll used around a photoconductor drum, such as a charge roll, a developing roll, or a transfer roll.

What is claimed is:

1. A roll comprising:

a metal core;

a base material layer made of rubber material, the base material layer provided on an outer circumference of the metal core;

a stress relaxation layer provided on the base material layer; and a front surface layer made of resin material, the front surface layer provided on the stress relaxation layer, wherein the stress relaxation layer is made of material being higher in hardness than the base material layer and larger in stretch than the front surface layer, and the stress relaxation layer is made of rubber material containing onself-crosslinking resin selected from a group consisting of blocked self-crosslinking isocyanate resin, blocked self-crosslinking epoxy resin, and blocked self-crosslinking phenolic resin.

2. The roll according to claim 1, wherein the base material layer is made of rubber material with low hardness not higher than 25 degrees in JIS-A hardness;

the front surface layer is made of resin material not larger than 30% in stretch; and the stress relaxation layer is made of material having stress not lower than 5 MPa at 10% stretch.

3. The roll according to claim 1, wherein the rubber material contains 20–150 parts by weight of the self-crosslinking resin relative to 100 parts by weight of the rubber material.

4. The roll according to claim 1, wherein the stress relaxation layer has a thickness in a range of from 5 to 50 μm.

5. The roll according to claim 1, wherein the base material layer has a thickness not smaller than 3 mm.

6. The roll according to claim 1, being a conductive roll having roll hardness not higher than 60 degrees in Asker-C hardness at a load of 1 kg.

* * * * *